United States Patent

Jaakkola et al.

[11] Patent Number: 5,869,786
[45] Date of Patent: Feb. 9, 1999

[54] ARRANGEMENT IN CONNECTION WITH A CONDUCTOR TRACK

[75] Inventors: Risto Jaakkola, Espoo; Eero Nieminen, Helsinki; Esko Väisänen, Klaukkala, all of Finland

[73] Assignee: Nordic Aluminium OY, Kirkkonummi, Finland

[21] Appl. No.: 801,467

[22] Filed: Feb. 18, 1997

[30] Foreign Application Priority Data

Feb. 16, 1996 [FI] Finland ................................ 960733
Nov. 14, 1996 [FI] Finland ................................ 964567

[51] Int. Cl.⁶ .................................................. H02G 3/28
[52] U.S. Cl. .......................... 174/96; 174/68.1; 191/45 R; 52/220.3
[58] Field of Search ........... 248/49, 68.1; 439/110–120; 174/96, 97, 99 R, 68.3, 95, 72 A, 98, 99 B, 48, 49; 191/45 R, 22 R, 23 R; 52/220.3, 220.5

[56] References Cited

U.S. PATENT DOCUMENTS

| | | | |
|---|---|---|---|
| 3,144,505 | 8/1964 | Fork | 174/70 R |
| 3,757,063 | 9/1973 | Hart et al. | 200/51.07 |
| 3,848,715 | 11/1974 | Hesse | 191/45 R |
| 4,003,618 | 1/1977 | Booty | 439/113 |
| 4,121,879 | 10/1978 | Olsen | 439/94 |
| 4,776,809 | 10/1988 | Hall | 439/116 |
| 4,919,625 | 4/1990 | Coutre | |
| 5,336,849 | 8/1994 | Whitney | 174/48 |

FOREIGN PATENT DOCUMENTS 231 428 8/1986 European Pat. Off. .
1566158 4/1980 United Kingdom .

Primary Examiner—Bot L. Ledynh
Assistant Examiner—Dhiru R. Patel
Attorney, Agent, or Firm—Sughrue, Mion, Zinn, Macpeak & Seas, PLLC

[57] ABSTRACT

An arrangement in connection with a conductor track, the conductor track having a connection groove extending in the longitudinal direction of the track for connecting devices to the conductor track, and current conductors mounted in the connection groove in the longitudinal direction thereof for supplying power by an adapter to the devices connected to the conductor track. To provide a simple solution which expedites the installation, the arrangement has at least one signal conductor fixed to the outer surface of the conductor track for supplying a bus control signal to a device connected to the conductor track by an adapter.

11 Claims, 3 Drawing Sheets

ARRANGEMENT IN CONNECTION WITH A CONDUCTOR TRACK

BACKGROUND OF THE INVENTION

1. Field of the Invention

The invention relates to an arrangement in connection with a conductor track, the conductor track comprising a connection groove extending in the longitudinal direction of the track for connecting devices to the conductor track by means of an adapter, current conductors mounted in the connection groove in the longitudinal direction thereof for supplying power by means of the adapter to the devices connected to the conductor track, and a separate signal conductor mounted on the track for supplying a bus signal by means of the adapter to the devices connected to the conductor track.

2. Description of Related Art

Conventional conductor track systems are currently used quite commonly in various rooms for connecting lighting devices, appliances and other similar devices to a power supply.

In prior art solutions it has not been possible to have device-specific control by a wired control circuit except by means of power current conductors of the track. In this case, the use of the power current conductors for supplying power is limited as regards the above-mentioned power current conductors. To build a control circuit by the use of a control cable is difficult or almost impossible in such a case.

SUMMARY OF THE INVENTION

The object of the invention is to provide an arrangement by which the limitations of the prior art can be eliminated. This is achieved with an arrangement of the invention which is characterized in that it comprises at least one signal conductor fixed to the outer surface of the conductor track for supplying a bus control signal to a device connected to the conductor track by means of the adapter.

The most significant advantage of the arrangement of the invention is that it completely eliminates the drawbacks of the prior art solutions. Control signal conductors can be mounted in place either during the manufacture of the conductor track or later on. Changing the positions of lamps or other devices connected to the conductor track system, or increasing or decreasing the number of the devices will not cause any problems, since there are no separate signal conductors. A further advantage of the invention is its simple construction, wherefore the manufacturing costs are low. Yet another advantage is that the arrangement of the invention does not entail any significant changes in the conductor track: the conductor track is still a compact integral part which can be easily and rapidly installed.

BRIEF DESCRIPTION OF THE DRAWINGS

In the following, the invention will be described in greater detail by means of an embodiment illustrated in the accompanying drawings, in which.

DESCRIPTION OF THE PREFERRED EMBODIMENTS

Figure 1:
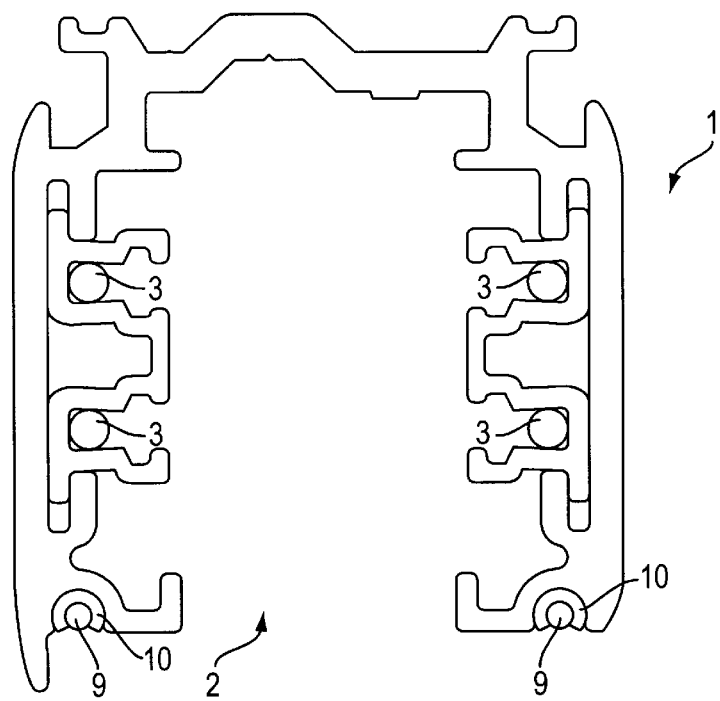
FIG. 1 is a schematic cross-sectional view of a conductor track provided with an arrangement of the invention.
Figure 2:
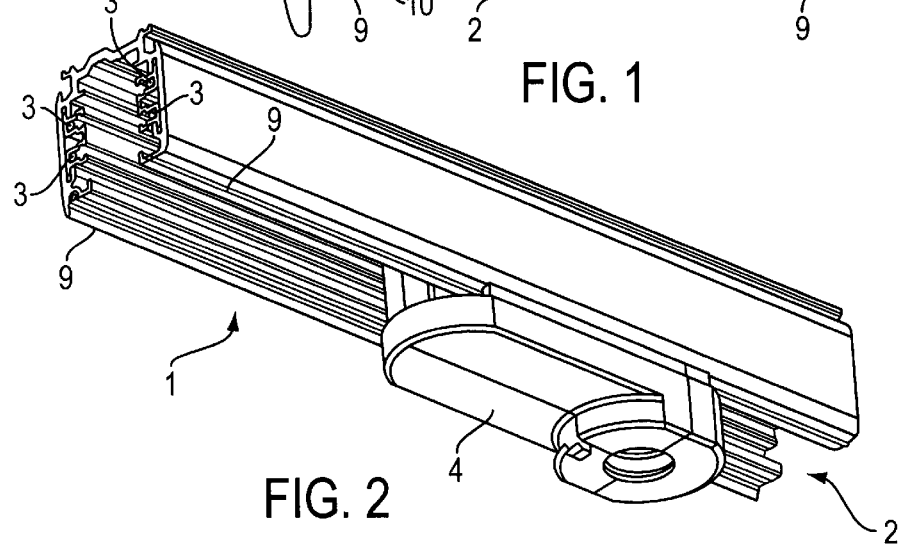
FIG. 2 is a schematic perspective view of a track provided with the arrangement of the invention, and an adapter connected thereto.

FIGS. 1 and 2 illustrate a conductor track provided with an arrangement of the invention. The conductor track is generally indicated by reference numeral 1. The conductor track 1 is manufactured, for example, from an aluminum profile. Reference numeral 2 indicates a connection groove extending in the longitudinal direction of the conductor track 1. Reference numeral 3 denotes current conductors mounted in the connection groove in the longitudinal direction thereof for supplying power to devices connected to the conductor track, e.g. lamps or other devices. The devices are connected to the conductor track 1 by means of an adapter 4. The adapter is illustrated schematically in FIG. 2.

Figure 3:
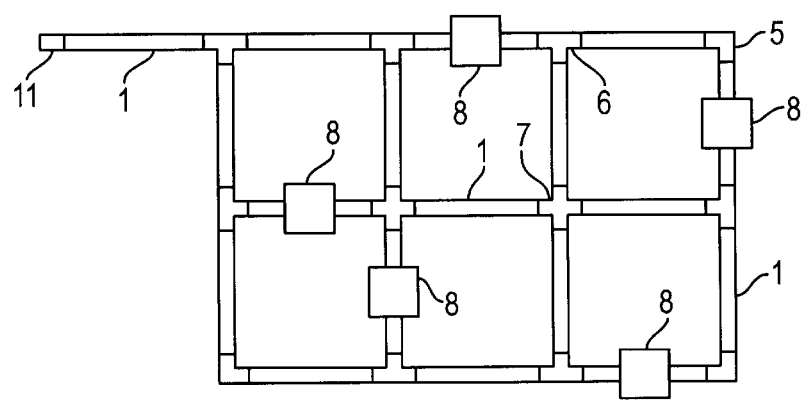
FIG. 3 is a schematic view of an exemplary track system formed from conductor tracks provided with the arrangement of the invention.

FIG. 3 is a schematic view of an example of a track system formed from conductor tracks 1 of FIGS. 1 and 2. The conductor tracks 1 are connected to each other by various couplers 5, 6, 7. Power is supplied to the track system by a connecting box 11. The devices, e.g. lamps, connected to the conductor tracks are indicated in FIG. 3 by reference numeral 8.

The features described above are fully known technology to one skilled in the art, wherefore they will not be explained more closely herein.

An essential feature of the invention is that the arrangement comprises at least one signal conductor 9 fixed to the outer surface of the conductor track 1 for supplying a bus control signal to a device 8 connected to the conductor track 1. The embodiment of FIG. 1 comprises two signal conductors 9. The signal conductors 9 are fixed at the side of the connection groove 2 in such a way that the bus control signal is connected to the lamp or other device 8 by means of an adapter 4. In the connecting box 11 or adapter 4, the signal is connected to the control circuit of the track. The signal conductors 9 can be fixed on different sides of the connection groove 2 as in the example of FIG. 1 or, alternatively, on the same side of the connection groove 2. The signal conductors 9 are insulated by an insulating layer 10 from the body 1 of the conductor track. The insulating layer 10 is mounted in such a manner that the signal conductors 9 are open on the surface of the conductor track. This detail can be seen especially clearly from FIG. 1.

The couplers 5, 6, 7 used at the connection points of conductor tracks, i.e. at the joints of adjacent conductor tracks, are provided with contacts, which connect the signal conductors mounted on the surface of the conductor track 1 to each other.

Figure 4:
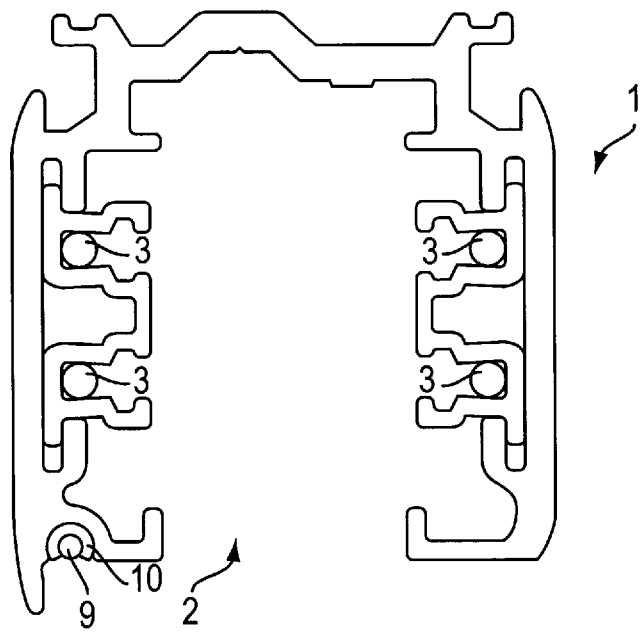
FIG. 4 is a schematic cross-sectional view of a second embodiment of a conductor track in which the invention is applied.
Figure 5:
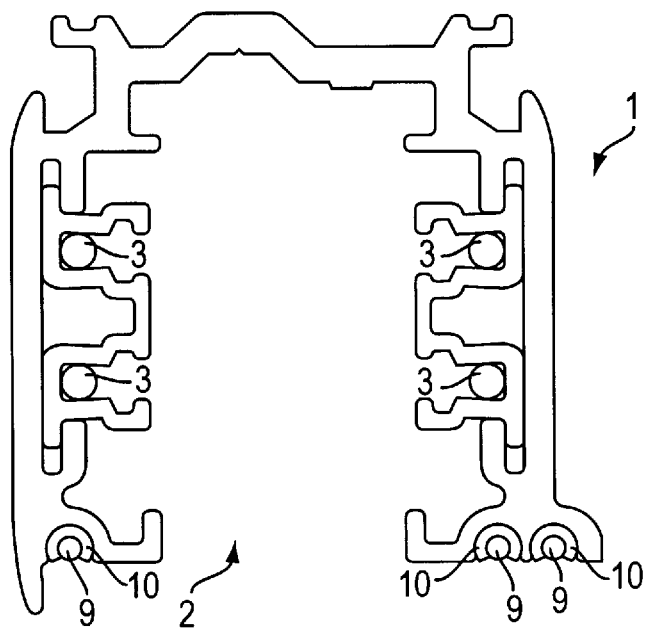
FIG. 5 is a schematic cross-sectional view of a third embodiment of a conductor track in which the invention is applied.

FIGS. 4 and 5 illustrate two further embodiments of the invention. The examples of FIGS. 4 and 5 are substantially similar to the example of FIG. 1. In FIGS. 4 and 5 the same numbers have the same significance as in FIG. 1. The embodiment of FIG. 4 comprises only one signal conductor 9, whereas the embodiment of FIG. 5 comprises three signal conductors 9.

Figure 6:
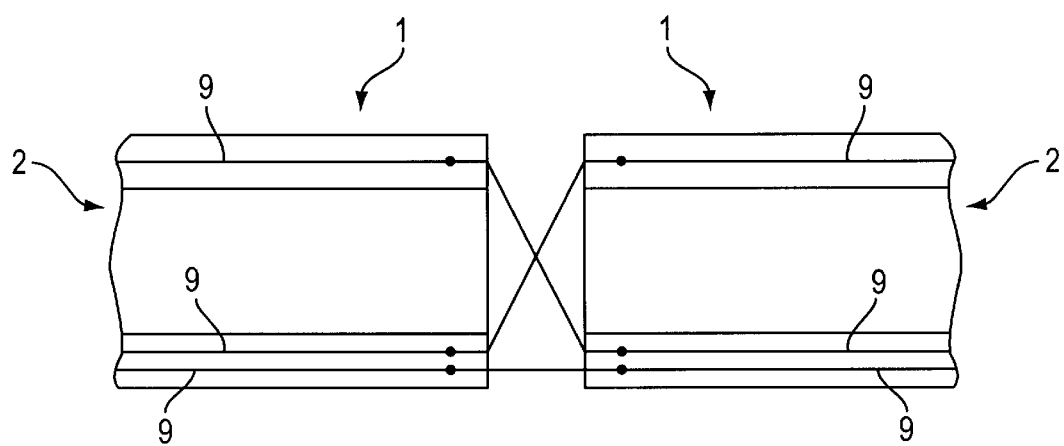
FIG. 6 is a schematic view of a track arrangement in which the invention is applied.

At the joints of the conductor tracks 1 it is possible, if necessary, to change the electrical position of the signal conductors of the control system. FIG. 6 is a schematical view of an embodiment where the signal conductors 9 closest to the connection groove 2 change places at the joints of the tracks 1. The embodiment of FIG. 6 can be implemented, for example, by providing the couplers shown in FIG. 3 with any necessary crossover arrangements. It will be obvious that the example shown in FIG. 6 can also be applied in such a way that all signal conductors 9 change places. In an embodiment with one signal conductor, the signal conductor can be switched from one side of the connection groove to the other side thereof, and so on.

The arrangement described above provides a solution by which lamps connected to a track system can be controlled for switching them on/off or adjusting them in a desired manner independently of one another. Instead of lamps, the invention may naturally also be applied to other devices.

The embodiments described above are not intended to limit the invention in any way, but the invention may be modified fully freely within the scope of the appended claims. It will thus be clear that the arrangement of the invention or its details need not be precisely as shown in the drawings, but other solutions are also possible. For example, the invention is not limited to the conductor track type illustrated in the drawings, but it can be applied to any corresponding conductor track type. The invention can also be applied to different track systems; the example of FIG. 3 is not intended to restrict the invention but only to serve as an example elucidating the basic idea of the invention. Furthermore, it should be noted that the number of signal conductors is not limited by the examples shown in the drawings, but it can vary. It is possible, for instance, to use more than three signal conductors. The signal conductors can be mounted on the conductor track in different ways, as disclosed in the claims. Moreover, the signal conductors do not have to be located at the side of the connection groove, but they may be positioned fully freely at a point desired on the outer surface of the track.

We claim:

1. A conductor track assembly including a conductor track, said conductor track comprising a connection groove extending in a longitudinal direction of the track for connecting devices to the conductor track by means of an adaptor; and current conductors mounted in the connection groove in the longitudinal direction thereof for supplying power by means of the adapter to the devices connected to the conductor track; the assembly further comprising at least one signal conductor fixed to an exterior surface of the conductor track, exclusively for supplying a bus control signal to at least one of the devices connected to the conductor track by means of the adaptor.

2. A conductor track assembly according to claim 1, wherein said at least one signal conductor comprises two signal conductors.

3. A conductor track assembly according to claim 1, wherein said at least one signal conductor comprises three or more signal conductors.

4. A conductor track assembly according to claim 1, wherein said at least one signal conductor is fixed to a side of the connection groove.

5. A conductor track assembly according to claim 1, wherein the signal conductors are fixed on different sides of the connection groove.

6. A conductor track assembly according to claim 1, wherein the signal conductors are fixed on a same side of the connection groove.

7. A conductor track assembly according to claim 1, wherein said at least one signal conductor is insulated from the conductor track and positioned so as to be exposed on a surface of the conductor track.

8. A conductor track assembly according to claim 1, further comprising a plurality of conductor tracks connected by joints, wherein said at least one signal conductor is arranged to change places at the joints of the conductor tracks.

9. A conductor track assembly comprising:
    a conductor track,
    an adapter mounted on said conductor track for connecting a device to said conductor track,
    a current conductor mounted to said conductor track for supplying power to the device,
    a signal conductor, separate from said current conductor, mounted to an exterior surface of said conductor track, for supplying a bus control signal to the device.

10. A conductor track assembly according to claim 9, wherein said signal conductor is formed from an electrically conductive wire insulated from said conductor track and exposed to said adapter mounted on said conductor track.

11. A conductor track assembly according to claim 9, wherein said signal conductor has a smaller cross-sectional area than said current conductor.

* * * * *